United States Patent [19]
Kawai

[11] 4,320,951
[45] Mar. 23, 1982

[54] EXTENSION TUBE FOR CAMERA

[75] Inventor: Tohru Kawai, Kawasaki, Japan

[73] Assignee: Canon Kabushiki Kaisha, Tokyo, Japan

[21] Appl. No.: 162,325

[22] Filed: Jun. 23, 1980

[30] Foreign Application Priority Data

Jun. 27, 1979 [JP] Japan .................................. 54-82089

[51] Int. Cl.³ .......................................... G03B 17/00
[52] U.S. Cl. ..................................... 354/286; 354/295
[58] Field of Search ..................... 354/29, 286, 295; 350/257

[56] References Cited

U.S. PATENT DOCUMENTS

| | | | |
|---|---|---|---|
| 3,858,225 | 12/1974 | Hasegawa et al. | 354/286 |
| 3,906,534 | 9/1975 | Shirasaki | 354/286 |
| 4,003,068 | 1/1977 | Hashimoto et al. | 354/286 |
| 4,230,403 | 10/1980 | Hashimoto et al. | 354/286 |
| 4,247,190 | 1/1981 | Hashimoto et al. | 354/286 |
| 4,251,134 | 2/1981 | Sato et al. | 354/286 |

FOREIGN PATENT DOCUMENTS 2804459 8/1978 Fed. Rep. of Germany .
2805210 8/1978 Fed. Rep. of Germany .

*Primary Examiner*—Russell E. Adams
*Attorney, Agent, or Firm*—Toren, McGeady & Stanger

[57] ABSTRACT

An extension tube or barrel which can be connected between a camera body and an interchangeable lens assembly includes a tubular body arranged to be coupled at one end to the camera body and at its other end to the lens assembly. A member within the tubular body is provided for engaging a diaphragm actuating member in the lens assembly in response to movement of an actuating member in the camera body. The extension tube also includes an arrangement for interchanging the positional relationship between the actuating member in the lens assembly and the member in the extension tube when the tubular body is either coupled to or uncoupled from the camera body. Thus, mechanical interference between the actuating member in the camera body and the corresponding member in the extension tube is avoided when the tubular body is placed against the lens mount of the camera and rotated during coupling or uncoupling of the extension tube.

12 Claims, 13 Drawing Figures

PRIOR ART

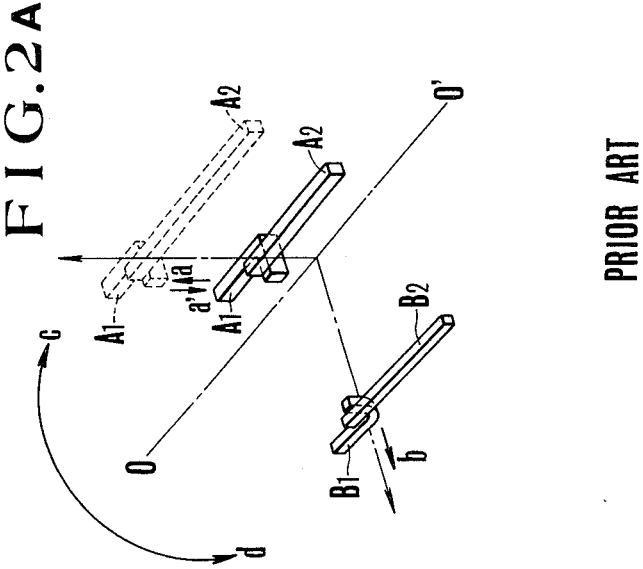
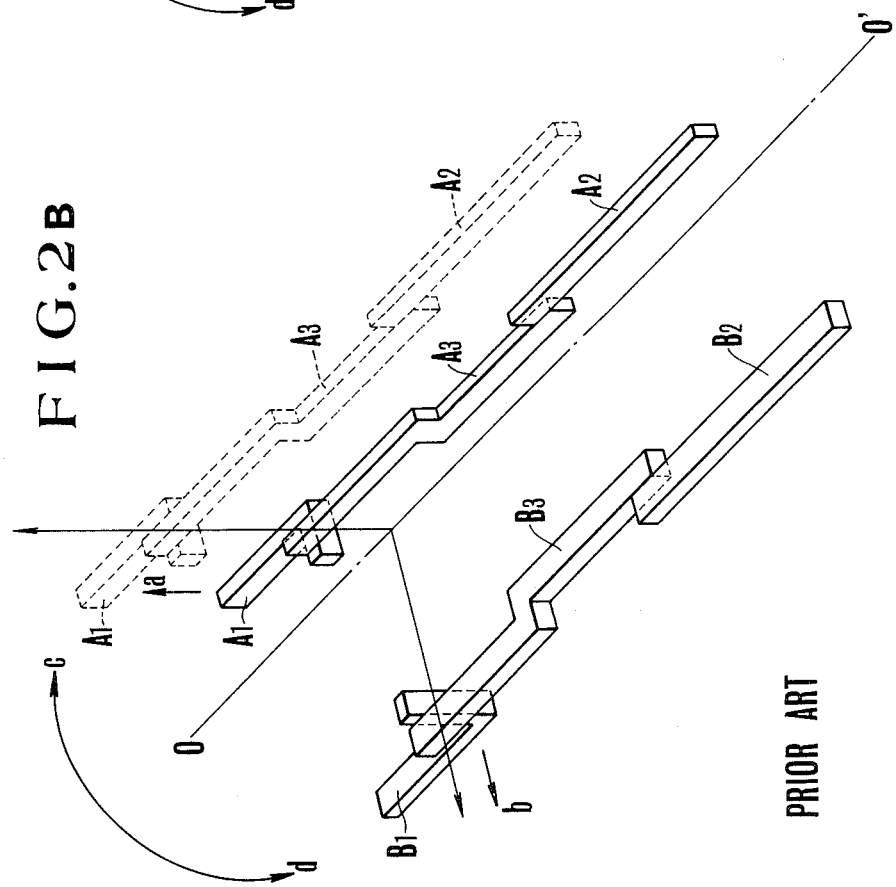

EXTENSION TUBE FOR CAMERA

BACKGROUND OF THE INVENTION

The present invention relates to an extension tube which can be connected between the lens mount of a camera body and an interchangeable lens assembly, so as to extend the lens assembly along its optical axis forwardly of the camera body.

It is known to provide an extension tube or barrel between a camera body and an interchangeable lens assembly, thereby extending the lens assembly forwardly of the camera body to make it possible to carry out close-up or copy photography. A wide variety of different types of extension tubes are available, corresponding to the various exposure adjustment arrangements provided between the diaphragm of the lens assembly and the diaphragm control mechanism in the camera body. The present invention relates to an extension tube or barrel adapted to be connected between an interchangeable lens assembly which includes an aperture indicating member and a diaphragm actuating member associated with a diaphragm presetting mechanism and a diaphragm device in the lens assembly, and a camera body which includes corresponding indicating and actuating members. The extension tube is adapted to cooperate with the indicating and actuating members of the camera body and the lens assembly, and it can be connected in place without mechanical interference occurring between members within the extension tube and the members in the camera body and the lens assembly.

Mechanical mounting arrangements for interconnecting the above described operating members are known from U.S. Pat. Nos. 3,858,225, 3,906,534 and 3,988,748. Further, an extension tube for use between an interchangeable lens assembly and a camera body is disclosed in U.S. Pat. No. 4,003,068.

According to the above cited U.S. Patents, the interchangeable lens assembly or the extension tube is provided with a breech lock ring in threaded engagement with the lens barrel, or with the barrel of the extension tube. A bayonet mount member is fixed to the breech lock ring so that, when coupled to a corresponding bayonet mount member in the camera body, the lens assembly is attached to the camera body. During attachment of the lens assembly, its aperture indicating member and diaphragm actuating member, though otherwise movable relative to the lens barrel, are maintained stationary at certain positions relative to the lens barrel. Therefore, to establish the bayonet coupling, the operator first adjusts the relative angular position of the lens barrel to the camera body by way of an index mark, and then turns the breech lock ring. An operative relationship between the aperture indicating members, and between the diaphragm actuating members of the camera body and the lens assembly is effected at this time.

The use of the breech lock rings in the interchangeable lens assembly and the extension tube has the advantage that the barrel, which holds the aperture indicating and actuating members in stationary positions, is restrained from rotation relative to the camera body so that the accuracy of exposure information obtained from the aperture indicating members can be increased and, because the lens barrel remains stationary after attachment, optical performance is maintained at a high level. However, there is a strong likelihood of the occurrence of handling difficulties, since the operator is required to grasp the breech lock ring in order to turn it. In other words, since the breech lock ring is arranged at the rearmost position (camera end) of the barrel and, moreover, is limited in its axial length so as to avoid interference with other operating members, attachment and detachment of the barrel has been thought to be somewhat time-consuming and difficult. In order to overcome this drawback, a new lens mount device has recently been developed, as disclosed in West German OS No. 2,804,459 (claiming priority of Japanese Open Patent No. 42-11280); and West German OS No. 2,805,210 (claiming priority of Japanese Open Patent Nos. 52-12827, 52-13391, 52-13392, 52-39176, and 52-44247). The new mount device includes a guide member which supports the aperture indicating member and the diaphragm actuating member for rotation about the optical axis of the lens, a lens barrel arranged to be rotatable relative to the guide member, and a releasable locking mechanism for holding the lens barrel in a certain position relative to the guide member after the guide member engages the camera body and is held at a fixed position relative to it. This arrangement permits the operator to grasp the lens barrel at a location where the diaphragm presetting ring, indicator ring, or focusing ring is fitted when turning the barrel to attach or detach this lens mount device to or from the camera body.

The above cited U.S. Pat. No. 3,988,748 discloses a camera for use with a lens assembly or extension tube which includes aperture indicating and diaphragm actuating members. The camera body, also shown in FIG. 1 of the present drawing, is provided with an aperture indicating member $A_1$ and a diaphragm stop down or actuating member $B_1$ for cooperating with the corresponding indicating and actuating members in the lens assembly. Since, in operation, the members $A_1$ and $B_1$ move in directions indicated by arrows a and b, the aperture indicating and diaphragm actuating members $A_2$ and $B_2$ in the lens assembly (FIG. 2A) must assume certain positions relative to the members $A_1$ and $B_1$ in the camera body when the members $A_2$ and $B_2$ are brought into registration with the camera body with the aid of index marks, these positions being shown in solid lines in FIG. 2A. When the lens assembly is rotated about its optical axis in a direction indicated by arrow c to obtain secure coupling between the bayonet members of the lens assembly and the camera body, the aperture indicating members $A_1$ and $A_2$ in the camera body and the lens assembly are allowed to move to positions shown by dashed lines in FIG. 2A. The operator then turns the diaphragm presetting ring (not shown) to manually select a desired aperture value, wherein the aperture indicating member $A_2$ in the lens assembly is moved in a reverse direction, shown by arrow a', from the position shown in dashed lines as the aperture value is varied from the minimum to the maximum value. Meanwhile, the indicating member $A_1$ in the camera body follows the indicating member $A_2$ in the lens assembly, and the final position of the member $A_1$, depending upon the selected aperture value, is detected by an exposure control mechanism (not shown). When the release mechanism of the camera is actuated, the diaphragm actuating member $B_1$ moves the actuating member $B_2$ in a direction indicated by arrow b. This motion of the actuating member $B_2$ causes the diaphragm presetting mechanism and the diaphragm device in the lens assembly to operate.

On the other hand, when an extension tube is inserted between a camera body including the aperture indicating member $A_1$ and diaphragm actuating member $B_1$, and an interchangeable lens assembly provided with the mounting device disclosed in the above-cited German and Japanese patents, the members in the camera body, extension tube and the lens assembly assume a relationship which is shown in FIG. 2B. Rotation of the diaphragm presetting ring (not shown) is transmitted through the member $A_2$ to the member $A_1$ in the camera body by way of an intermediate aperture indicating member $A_3$ in the extension tube. Actuation of the camera release mechanism causes the actuating member $B_1$ in the camera body to move in the direction of the arrow b, and this motion is transmitted by way of an intermediate diaphragm actuating member $B_3$ in the extension tube to actuating member $B_2$ which, in turn, transmits this motion to the diaphragm presetting mechanism and the diaphragm device in the lens assembly. In operation, the members $A_1$, $A_2$ and $A_3$ move in an opposite sense to the direction of movement of the members $B_1$, $B_2$ and $B_3$, as shown in FIG. 2B.

While the lens assembly including the new mount device described above is detached from the camera body, the guide member and the lens barrel are held at a certain fixed position relative to one another. When the lens assembly is attached to the camera body or to an extension tube, and the lens barrel is rotated through a certain angle to complete the bayonet coupling, an operative positional relationship is established between the indicating and actuating members in the attached pair. In order to allow the lens assembly to be attached with high accuracy and, in particular, with improved reliability, a lock mechanism is provided for preventing unintentional relative rotation between the lens barrel and the guide member after the lens barrel is rotated through the required angle to complete the bayonet coupling, as disclosed in the above cited German and Japanese patents. Further, the guide member can be locked on the camera body (or extension tube) indirectly in response to operation of the lock mechanism, that is, by way of the lens barrel. This feature, however, gives rise to a serious problem in the design of an extension tube for use with the new mount device, since the directions of movement of the aperture indicating and diaphragm actuating members (arrows a and b) and the rotation of the lens barrel (arrows c and d) are relatively complex.

FIGS. 3A and 3B are perspective views showing an arrangement by which the aperture indicating members $A_1$, $A_2$ and $A_3$, and the diaphragm actuating members $B_1$, $B_2$ and $B_3$ are placed in operative relationship when the lens mount device described above is coupled to an extension tube which is then attached to a camera body. It should be noted that when the lens mount device is first attached to the extension tube, the lens is handled in a manner similar to that when it is attached directly to the camera body. When the bayonet coupling of the lens mount device is engaged with the extension tube, the lock mechanism of the lock device operates, and the guide member, lens barrel, aperture indicating member $A_2$ and actuating member $B_2$ of the mount device are maintained in fixed positions relative to the body of the extension tube.

Attempts have been made to provide an extension tube with a mount device having operating advantages similar to those of the above described lens mount device, including a guide member which is fixed against rotation relative to the camera body and which supports aperture indicating and diaphragm actuating members for rotation about the optical axis, and a main body arranged to be rotatable relative to the fixed guide member. It has been discovered, however, that a problem may arise when such an extension tube is attached to and detached from the camera body.

Specifically, referring to FIG. 3A, after the lens assembly is attached to the extension tube and the extension tube is attached to the camera body, the aperture indicating member $A_2$ and diaphragm actuating member $B_2$ in the lens mount device are fixed in position relative to lens barrel F, since guide member E and the lens barrel F are locked together by lock mechanism G. Therefore, attachment of the main body of the extension tube to the camera body causes the aperture indicating member $A_2$ and the diaphragm actuating member $B_2$ to rotate simultaneously. In order to transmit movement between the members of the camera body and the lens mount device, it is required that aperture indicating members $A_1$, $A_2$ and $A_3$, and the diaphragm actuating members $B_1$, $B_2$ and $B_3$ assume the relative positions shown in FIG. 3B. However, when the actuating member $B_2$ in the lens mount device and the actuating member $B_3$ in the extension tube are moved from the positions of FIG. 3A to the positions of FIG. 3B, these members interfere with each other, thereby making it impossible to allow the extension tube to remain attached to the lens mount device. Conversely, when the extension tube is detached from the camera body while the lens remains attached to the extension tube, the actuating member $B_2$ in the lens mount device interferes with the actuating member $B_3$ in the extension tube as the indicating member $A_2$ and the actuating member $B_2$ in the lens mount device are rotated in the direction of arrow d, together with the main body of the extension tube.

SUMMARY OF THE INVENTION

An object of the present invention is to provide an extension tube which can be used with the newly developed interchangeable lens mount device discussed above.

Another object of the present invention is to reduce the time and effort required to attach and detach an extension tube to and from a camera body by providing, in the extension tube, a guide member arranged to be fixed against rotation relative to the camera body, an intermediate aperture indicating member and an intermediate diaphragm actuating member supported in the guide member for rotation about the optical axis of the lens mount device, and a main body arranged to be rotatable relative to the guide member wherein the extension tube can be attached to the camera body by grasping and turning its main body.

A further object of the present invention is to provide a mechanism for avoiding mechanical interference between at least one of the intermediate members in the extension tube with the members in the lens mount device when the extension tube is attached to and detached from the camera body.

Yet another object of the present invention is to provide an extension tube including a mechanism for interchanging the relative positions of the diaphragm actuating members in the lens mount device and the extension tube when the extension tube is either attached to or detached from the camera body.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there are illustrated and described preferred embodiments of the invention

BRIEF DESCRIPTION OF THE DRAWING

In the drawing:

FIG. 2A is a geometric diagram of indicating and actuating members in the camera body and in the lens mount device, showing operative relationships between the members and their directions of movement;

FIG. 2B is a diagram similar to FIG. 2A, showing indicating and actuating members of an extension tube in operative relationship with the indicating and actuating members of the camera body and the lens mount device;

DETAILED DESCRIPTION OF THE INVENTION

Figure 4A:
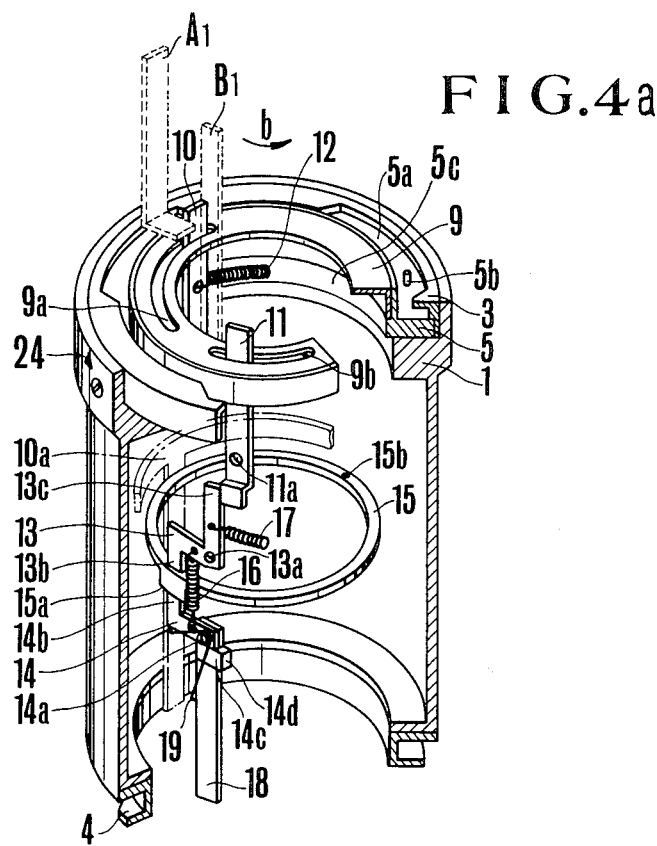
FIG. 4a is a perspective view, partly in section, of one embodiment of an extension tube according to the present invention.

FIG. 4 shows an extension tube or barrel according to the present invention, the tube including an elongated body 1. A first annular bayonet member 3 is fixed at one end of the tubular body 1 for coupling with a bayonet ring (not shown) on a camera body (not shown) to which the extension tube is to be attached. A second annular bayonet member 4 is fixed at the other end of the tubular body 1 for coupling with the previously discussed lens mount device in an interchangeable lens assembly. When the lens assembly is coupled to the tubular body 1, the optical axis of the lens assembly becomes aligned with or parallel to the axis of the tubular body 1.

Figure 1:
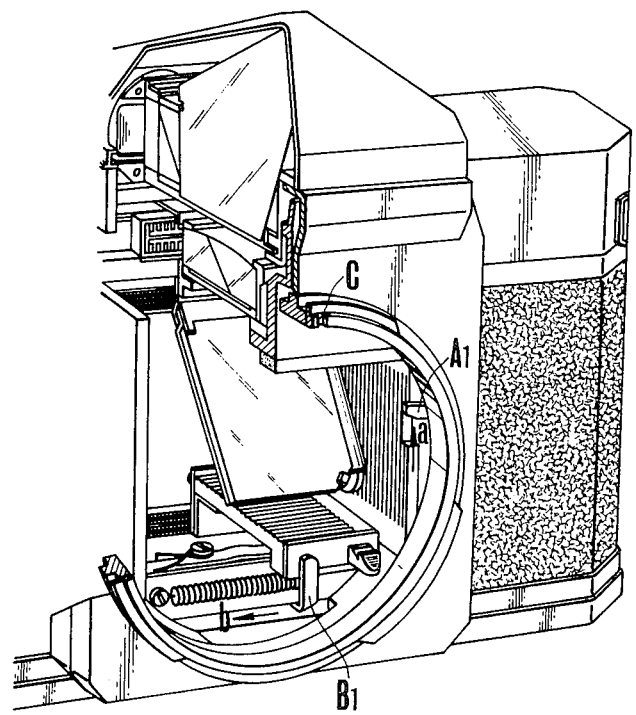
FIG. 1 is a perspective view, with parts broken away, showing details of a conventional camera body to which an extension tube of the present invention can be attached.

A sleeve-like guide member 5 is inserted for rotation within a corresponding annular recess formed in the tubular body 1 next to the first bayonet member 3. The guide member 5 has a reference surface 5a for contacting a lens mount on the camera body when the tubular body 1 is attached or coupled to the camera body. A mechanism is provided for fixing the guide member 5 against rotation relative to the camera body and includes a position adjusting pin 5b extending normal to the reference surface 5a. When the position adjusting pin 5b is seated in an opening C formed in a portion of the bayonet lens mount on the camera body (FIG. 1), the guide member 5 remains stationary relative to the camera body as the tubular body 1 is rotated to complete its attachment to the camera body.

Figure 5:
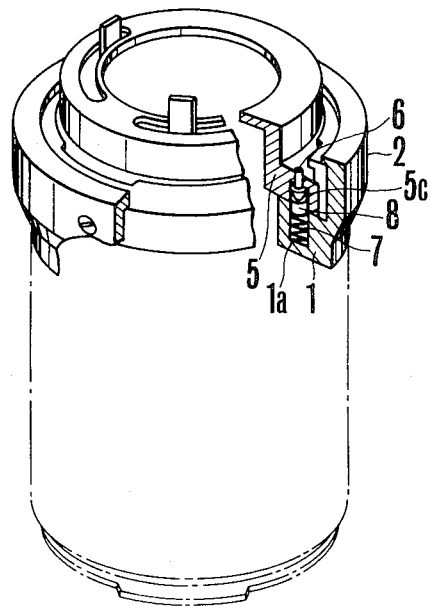
FIG. 5 is a view similar to FIG. 4, showing details of a locking mechanism in the extension tube.

FIG. 5 shows a lock mechanism which extends between the guide member 5 and the tubular body 1. The lock mechanism includes an actuating pin 6 which is tightly fitted for axial sliding movement in a hole 5c provided through the guide member 5, and a lock pin 8 fitted in a recess 1a in the tubular body 1. A spring 7 in the recess 1a urges the lock pin 8 toward the camera body. The hole 5c is aligned with the recess 1a when the tubular body 1 is rotated to a certain position relative to the guide member 5, whereat the lock pin 8 extends between the hole 5c and the recess 1a to check further rotation of the tubular body 1 relative to the guide member 5.

Referring again to FIG. 4, a generally circular wall member 9 is integral with the guide member 5. Wall member 9 has two slots 9a and 9b each of which extends arcuately about the tubular body axis. An aperture indicating member 10 extends through slot 9a, and a first diaphragm actuating lever 11 extends through slot 9b. Aperture indicating member 10 operates to transmit aperture value information between the camera body and the lens mount device. A ring part 10a is integral with and extends transversely of the indicating member 10 within the tubular body 1, and has a radius which is about equal to that of the guide member 5. A ball bearing (not shown) is positioned between the ring part 10a and the guide member 5 to enable the aperture indicating member 10 to rotate smoothly about the tubular body axis. A tension spring 12 is provided between the aperture indicating member 10 and the guide member 5 or the tubular body 1 to urge the indicating member 10 in a clockwise direction as viewed in FIG. 4, so that when the tubular body 1 is detached from the camera body, the indicating member 10 is brought into contact with one end of the arcuate slot 9a.

The first actuating lever 11 is pivotally mounted on a pin 11a (only the hole with which the pin engages is shown) fixed to the inner circumference of the guide member 5, and extends at one end through the arcuate slot 9b to engage a diaphragm stop down or actuating lever B₁ in the camera body.

First and second bell cranks 13,14 are pivoted on corresponding pins 13a and 14a (only the holes with which these pins engage are shown) fixed to the guide member 5. One end 13b of the first bell crank 13, and one end 14b of the second bell crank 14 face toward one another and each is urged against a cam lobe 15a on a cam ring 15 by a spring 16 connected between the first and second bell cranks 13,14. Another spring 17 connected to the first bell crank 13 urges it to pivot in a clockwise direction as viewed in FIG. 4 about pin 13a so that its opposite end 13c abuts one end of the first actuating lever 11.

Figure 4C:
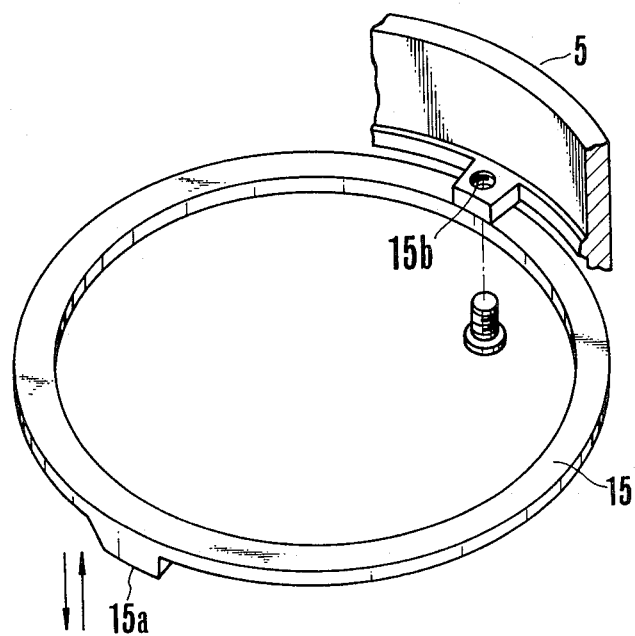
FIG. 4c shows the holding mechanism of the ring member.
Figure 4B:
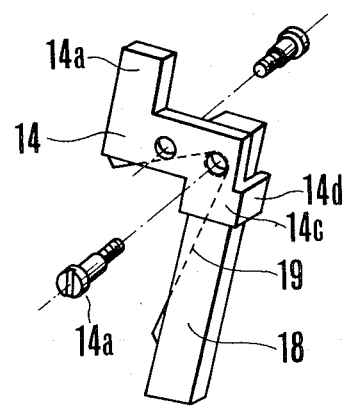
FIG. 4b is a schematic view showing the relation between the lever and the bell crank.
Figure 7:
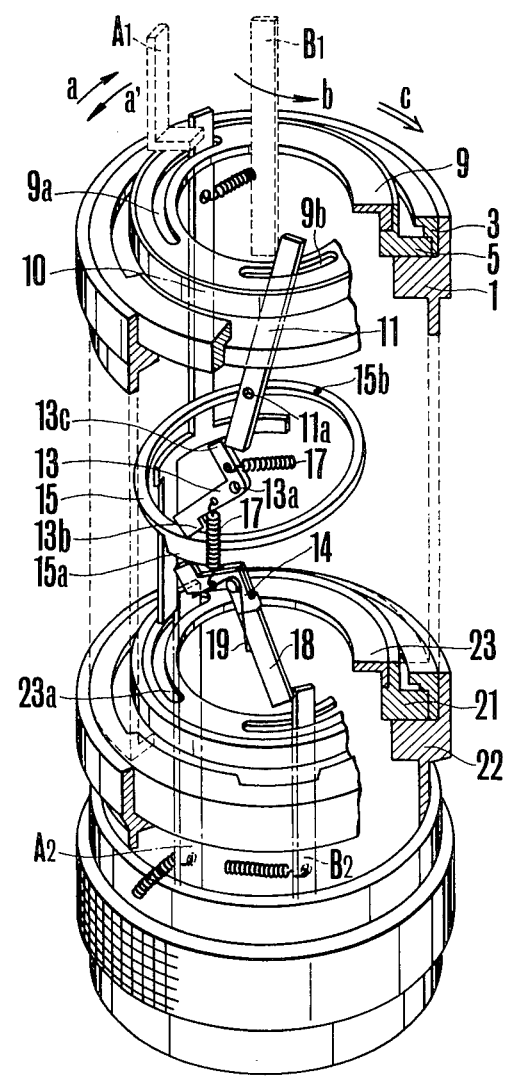
FIG. 7 is a view similar to FIG. 6, showing the operation of actuating members in the extension tube and lens mount device.

The cam ring 15 is pivoted at poin 15b, opposite the cam part 15a, to the inner circumferential surface of the tubular body 1. This connection point 15b allows the cam ring 15 to be swung so that the plane containing the cam ring 15 rotates about an axis which is transverse to the axis of the tubular body 1, as shown in FIG. 4c and FIG. 7. A second actuating lever 18 is pivotally mounted on the pin 14a (only the hole with which the pin engages is shown) associated with the second bell crank 14, and lever 18 is biased by a spring 19 as shown in FIG. 4b in a direction such that one end of the lever 18 engages an arm part 14d which is formed by bending the end 14c of the second bell crank 14. The lever 18 is thereby aligned parallel to the optical axis.

When the extension tube of the above-described construction is brought into contact with the camera body, so that an index mark 1a on the tubular body 1 is aligned with a position adjusting index mark on the camera body (not shown), and the tubular body 1 is pushed toward the camera body while the position adjusting pin 5b on the guide member 5 is seated in the hole C in the bayonet ring on the camera body, the lock mechanism shown in FIG. 5 is released and the tubular body 1 becomes rotatable about the optical axis relative to the camera body.

Figure 6:
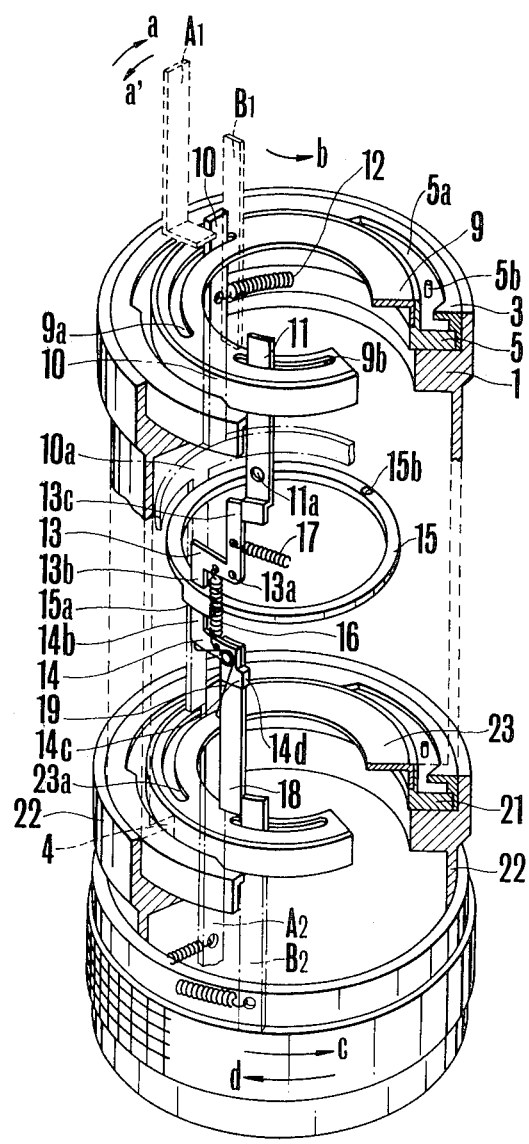
FIG. 6 is a perspective view, with parts broken away, showing relative positions of parts within the extension tube of FIG. 4 when it is attached to the lens mount device.

Referring next to FIGS. 6 and 7, operation of the interchangeable lens assembly including the lens mount device, extension tube and camera body, after attachment to one another, will now be explained. In FIG. 6, the aperture indicating member $A_1$ and the diaphragm actuating member $B_1$ of the camera body are shown, and only essential parts of the lens assembly are shown together with the extension tube. The detailed features of the construction and arrangement of the lens assembly are described in the above cited German and Japanese patents, the relevant portions of which are incorporated by reference herein. Accordingly, further explanation of the lens assembly is omitted. As shown in FIG. 6, the camera body, extension tube and lens assembly are bayonet lock-coupled with one another. Therefore, another lock mechanism which is arranged within a guide member 21 and a lens barrel 22 of the lens assembly is engaged, so that the guide member 21 and the lens barrel 22 are fixed in position relative to the tubular body 1 of the extension tube.

When the operator turns a diaphragm presetting ring (not shown) to select a desired aperture value, the aperture indicating member $A_2$, which is operatively associated with the diaphragm presetting ring, is moved in an arcuate slot 23a in a rear wall member 23 fixed to the guide member 21. The aperture indicating member $A_2$ is thus brought to a position corresponding to the selected aperture value. This motion of the aperture indicating member $A_2$ is transmitted through the aperture indicating member 10 in the extension tube, and moves the aperture indicating member $A_1$ in the camera body in a direction indicated by arrow a. The motion of the member $A_1$ is then detected to provide a corresponding exposure value by an exposure control mechanism (not shown). Accordingly, exposure information is transferred from the lens assembly to the camera body.

When the release mechanism within the camera (not shown) is actuated, the actuating member $B_1$ is moved in a direction indicated by arrow b, as shown in FIG. 7, thus pivoting the first actuating lever 11 about the pin 11a. Actuating lever 11 then pivots the first bell crank 13 about the pin 13a which, in turn, causes the end 13b of the bell crank 13 to move the cam part 15a of the cam ring 15 in a direction away from the camera body (downward as viewed in FIG. 7). The second bell crank 14 and lever 18 are then moved together so as to cause the actuating member $B_2$ in the lens assembly to move in the direction of the arrow b. A diaphragm presetting mechanism and a diaphragm device (not shown) in the lens assembly are then actuated to provide a proper exposure.

Figure 3A:
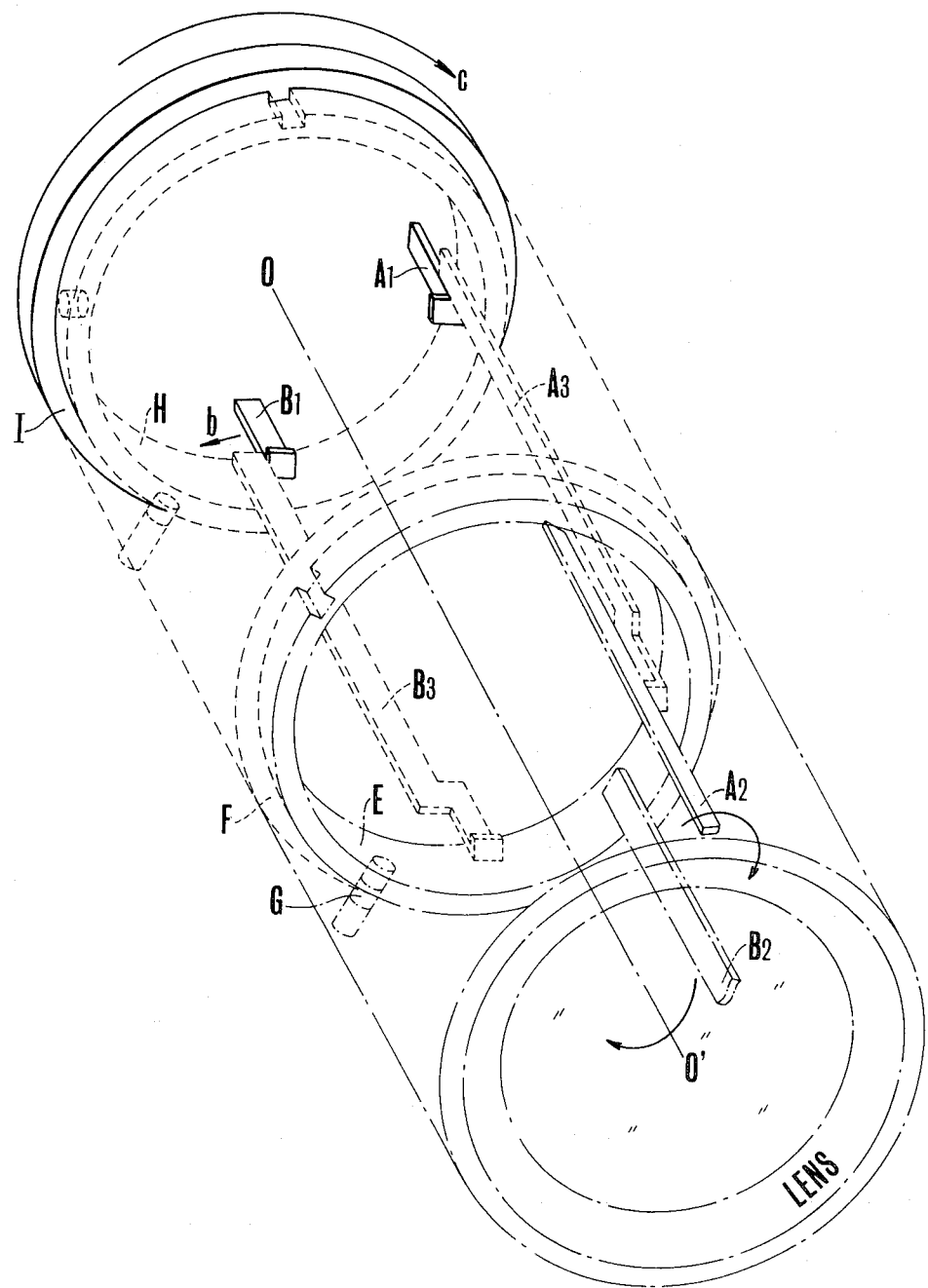
FIG. 3A is a perspective schematic view of essential parts of the extension tube, lens mount device and camera body during attachment to one another.
Figure 3B:
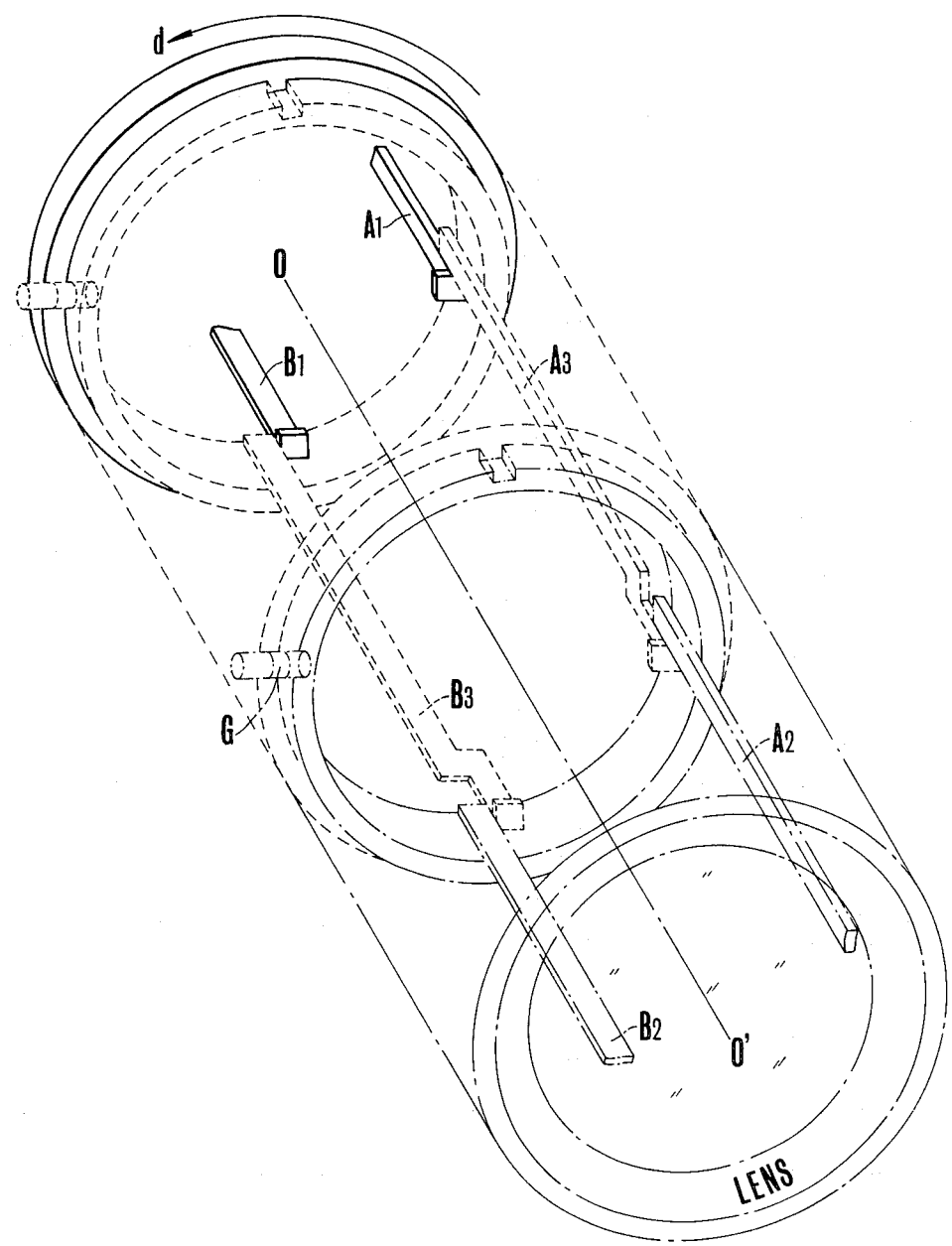
FIG. 3B is a view similar to FIG. 3A showing operating positions of the essential parts after the extension tube has been attached to the camera body.
Figure 8:
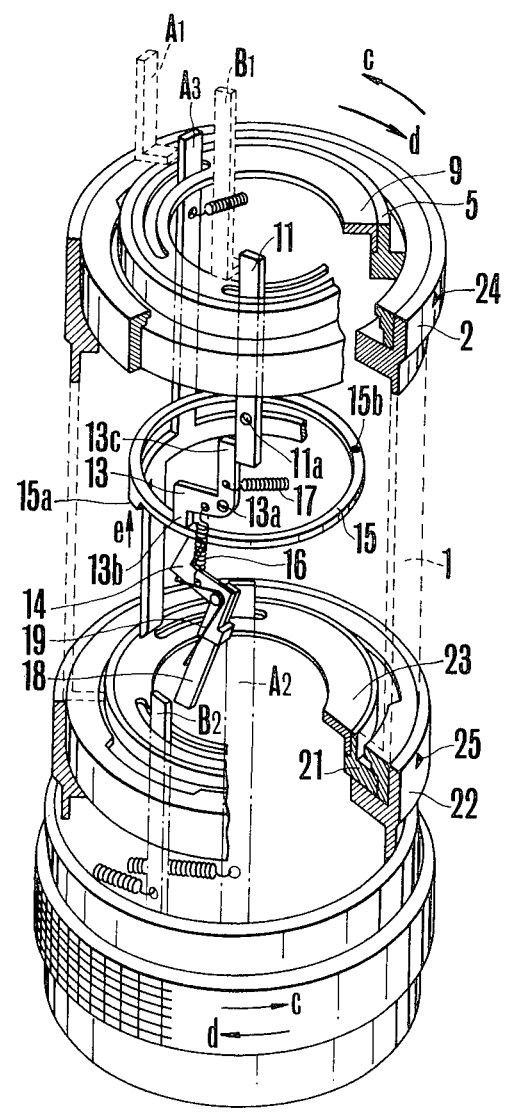
FIG. 8 is a view of the extension tube of FIG. 6 when it is detached from the camera body with the lens mount device attached to the tube.

With reference to FIGS. 6 to 8, operation of the various parts, when the extension tube is detached from the camera body with the interchangeable lens assembly remaining attached to the extension tube, will now be described. As explained in connection with FIGS. 3A and 3B, the new lens mount device includes the guide member 21, with the aperture indicating member $A_2$ and diaphragm actuating member $B_2$ supported by the guide member 21 for rotation about the tubular body axis. Also, the lens barrel 22 is arranged to be rotatable relative to the guide member 21 and includes a lock mechanism which operates to check relative rotation between the guide member 21 and the lens barrel 22 after the lens mount device is attached to the extension tube. It will therefore be understood that a problem can arise when the extension tube is to be detached from the camera body. That is, the second actuating lever 18 in the extension tube must be displaced to the side of the actuating member $B_2$ opposite the side which initially faces the lever 18, otherwise the lens assembly could not be rotated in the direction of arrow d by grasping and rotating the lens barrel 22 to release the extension tube from the bayonet coupling with the camera body. In accordance with the present invention, this displacement is achieved by operation of the bell cranks 13,14 and the cam ring 15, as explained below.

Referring to FIG. 6, when the tubular body 1 of the extension tube is rotated in the direction of arrow b, the lens assembly turns together with the tubular body 1, since guide member 21 and the lens barrel 22 are locked to each other by the lock mechanism in the lens assembly. Because the guide member 5 in the extension tube is prevented from rotating by the position adjusting pin 5b which engages the hole C in the camera body, the first actuating lever 11 and bell cranks 13,14 are also restrained from rotation about the tubular body axis.

The rotational movement of the tubular body 1 of the extension tube about its axis in the direction of arrow d then causes the aperture indicating member $A_2$ in the lens assembly also to move in the direction of arrow a. This, in turn, causes the apertue indicating member 10 in the extension tube and the aperture indicating member $A_1$ in the camera body to move in the direction of arrow a as well. The actuating member $B_2$ in the lens assembly is rotated in the direction of arrow d along with the extension tube.

As the lens assembly and the tubular body 1 of the extension tube are rotated in the direction of arrow d, the end 14b of the second bell crank 14 slides off the cam part 15a of the cam ring 15 and, since the other end 14c of bell crank 14 is urged by the spring 16 to move toward the first bell crank 13, the second bell crank 14 pivots about the pin 14a in a clockwise direction as viewed in FIG. 8. This causes the second actuating lever 18 to slide over to the opposite side of the actuating member $B_2$ in the lens assembly, as the member $B_2$ is moved in the direction of arrow d by rotation of the entire lens assembly together with the tubular body 1 of the extension tube, until the bayonet coupling between the extension tube and the camera body is released.

Thus, in accordance with the present invention, it is now possible to detach the extension tube from the camera body while the lens assembly remains attached to the extension tube.

In order to detach the lens assembly from the extension tube, the operator first releases the lock mechanism between the guide member 21 and the lens barrel 22 of the lens assembly, and then rotates the lens barrel 22 in the direction of arrow d (FIG. 8) while holding the extension tube stationary, until the bayonet coupling between the extension tube and the lens assembly is released. Because the actuating member $B_2$ and second actuating lever 18 have interchanged their relative positions, no mechanical interference takes place when the lens assembly is detached from the extension tube.

Next, the attachment of the extension tube to the camera body, when the lens assembly is detached from the extension tube, will now be explained. As the extension tube is placed against the camera body so that its index mark 24 is aligned with the index mark on the camera body, the aperature indicating member $A_1$ in the camera body and the aperture indicating member 10 in the extension tube assume the same relative positions as when the lens assembly is attached to the extension tube. While the guide member 5 in the extension tube is prevented from rotating relative to the camera body, the tubular body 1 is then rotated to establish the bayonet coupling between the extension tube and the camera body. Afterwards, the lens assembly is attached to the extension tube by aligning an index mark (not shown) on the extension tube with an index mark 25 on the lens barrel 22 so that the aperture indicating member 10 in the extension tube and the aperture indicating member $A_2$ in the lens assembly assume the relative positions shown in FIG. 3A. The second actuating lever 18 in the extension tube and the actuating member $B_2$ in the lens assembly assume the same relative position as shown for the members $B_3$ and $B_2$ in FIG. 3A, and the lens barrel 22 is rotated so as to allow the member $A_2$ in the lens assembly to move along with the lens barrel 22. Thus, the aperture indicating member 10 in the extension tube and the member $A_1$ in the camera body are moved to the relative position shown in FIG. 3B. During this time, the aperture indicating member $A_1$ in the camera body is urged by a spring member (not shown) to move from the position shown in solid lines to the position shown in dashed lines. This completes the attachment operation of the lens assembly to the extension tube when the latter is already attached to the camera body.

In the event the extension tube is to be attached to the camera body with the lens assembly already attached to the extension tube, an operation reverse to that required for detaching the extension tube from the camera body with the lens assembly already attached to the extension tube is required, in order to interchange the relative positions of the actuating member $B_2$ in the lens assembly and the second actuating lever 18 in the extension tube. That is, after the lens assembly is attached to the extension tube, the relative positions of the aperture indicating members $A_1$, $A_2$ and $A_3$, and the actuating members $B_1$, $B_2$ and $B_3$ are interchanged from those shown in FIG. 3A to those of FIG. 3B when the lens barrel 22 is rotated in the direction of arrow c and the guide member 5 is fixed against rotation relative to the camera body. When the tubular body 1 of the extension tube is rotated, the lens assembly rotates together with it. Because of this, each actuating member $B_1$, $B_2$ and $B_3$ must be permitted to move from its position shown in FIG. 3A to those shown in FIG. 3B. This requires the actuating member $B_2$ in the lens assembly and the actuating member $B_3$ in the extension tube interchange their relative positions.

Figure 9:
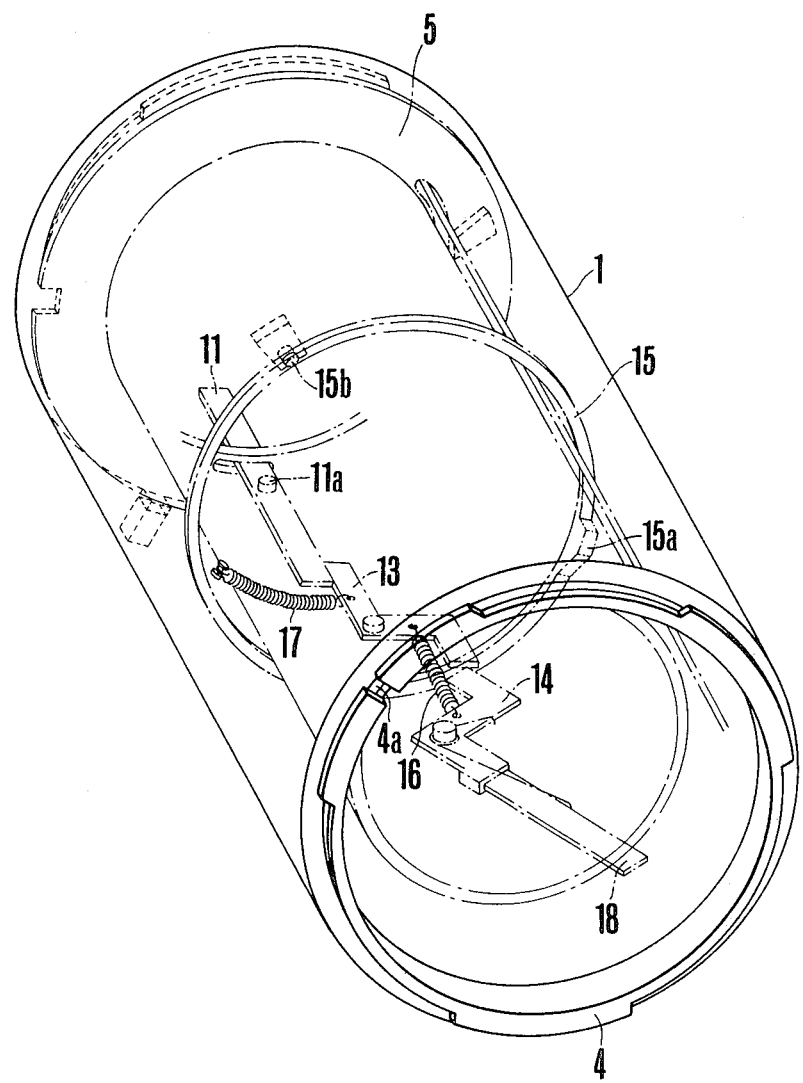
FIG. 9 is a perspective schematic view showing the positions of parts within the extension tube after it is detached from the camera body.

When the extension tube is detached from the camera body, its parts are arranged at positions shown in FIG. 9. The guide member 5 and tubular body 1 are locked together by the lock mechanism previously described, and the cam lobe 15a of the cam ring 15 is at a position remote from the ends 13b, 14b of the first and second bell cranks 13,14, owing to the pivotal connection of the cam ring 15 to the inner circumferential surface of the tubular body 1 at point 5b. The second bell crank 14 is urged by the spring 16 to pivot in a clockwise direction as viewed in FIG. 8. As a result, the second actuating lever 18 pivots about the pin 14a associated with the second bell crank 14 so as to avoid mechanical interference with the actuating member $B_2$ in the lens assembly.

When the tubular body 1 of the extension tube is rotated in a direction to effect coupling of the extension tube on the camera body, the cam ring 15 rotates together with the tubular body 1. When the rotational movement of the tubular body 1 relative to the camera body is completed to establish the bayonet coupling, the cam lobe 15a of the cam ring 15 is interposed between the confronting ends 13b, 14b of the first and second bell cranks 13, 14. The second bell crank 14 is pivoted by the cam lobe 15a against the force of the spring 16, thereby bringing the second actuating lever 18 to the position at which it cooperates with the actuating member $B_2$ in the lens assembly.

As described above, the present invention provides an extension tube which can be easily handled during attachment to and detachment from a camera body by grasping and rotating the tubular body of the extension tube. The accuracy of optical adjustments which are transmitted between the lens assembly and the camera body is maintained within specified tolerances by way of the arrangement of the tubular body 1 and the guide member 5. While the extension tube of the present invention has been described without the provision of its own optical system wherein it can be used for close-up and copy photography, both of which require that the camera closely approach the object, it is also possible to incorporate a concave lens within the extension tube. Thus, the focal length of the lens assembly can be decreased or increased depending upon whether the extension tube is attached at the front or the rear of the lens assembly. That is, the extension tube of the present invention can provide wide angle or telephoto conversion depending upon the manner in which it is combined with the lens assembly.

While specific embodiments of the invention have been shown and described in detail to illustrate the application of the inventive principles, it will be understood that the invention may be embodied otherwise without departing from such principles.

What is claimed is:

1. An extension tube adapted to be connected between a camera body which includes a movable actuating member, and an interchangeable lens assembly which has an optical axis and which includes an exposure control mechanism and a first member for actuating the exposure control mechanism, said extension tube comprising:

(a) an elongated tubular body arranged to be coupled with the camera body at one end of said tubular body, and to be coupled with the lens assembly at the other end of said tubular body;

(b) means within said tubular body including a second member for engaging the first member of the lens assembly in response to actuating movement of the actuating member in the camera body; and (c) means within said tubular body for interchanging the positional relationship between the first member in the lens assembly and said second member of said engaging means, said interchanging means adjusting the positional relationship to maintain an operative association between the first member and the second member so that the second member can actuate the first member when said tubular body is coupled to the camera body.

2. An extension tube according to claim 1, wherein said tubular body is arranged to be coupled and uncoupled from the camera body when said tubular body is rotated about its axis relative to the camera body, and said interchanging means includes a third member connected for rotation with said tubular body for clearing said second member of said engaging means from contact with the first member in the lens assembly.

3. An extension tube according to claim 1 or 2, including means arranged within said tubular body for rotation about the axis of said tubular body for transmitting an aperture indication from the lens assembly to the camera body.

4. An extension tube according to claim 3, including a guide member mounted at said one end of said tubular body for supporting said second member for movement relative to said guide member and means for fixing said guide member against rotation relative to the camera body after said tubular body is coupled to the camera body, and said tubular body is arranged to be rotatable relative to said guide member when said guide member is fixed relative to the camera body.

5. An extension tube according to claim 4, wherein said fixing means engages the camera body to retain said guide member at a fixed position relative to the camera body, and including means engageable with the lens assembly for maintaining the lens assembly at a fixed position relative to said tubular body.

6. An extension tube according to claim 5, including means for holding said guide member and said tubular body at fixed positions relative to one other when said tubular body is uncoupled from the camera body and for enabling said tubular body to rotate relative to said guide member when said tubular body is coupled to the camera body.

7. An extension tube adapted to be connected between a camera body which includes a movable actuating member, and an interchangeable lens assembly which has an optical axis and which includes an exposure control mechanism and a first member for actuating the exposure control mechanism said extension tube comprising:

(a) an elongated body arranged to be rotatable about its axis relative to the camera body;

(b) guide means mounted within said tubular body wherein said guide means is arranged to be retained at a fixed position relative to the camera body;

(c) first actuating means supported on said guide means within said tubular body for rotational movement about the tubular body axis in response to actuating movement of the actuating member in the camera body;

(d) second actuating means supported on said guide means within said tubular body for rotational movement about the tubular body axis to transmit the movement of said first actuating means to the first member in the lens assembly;

(e) means within said tubular body for transmitting the movement of said first actuating means to said second actuating means; and (f) means within said tubular body for interchanging the relative positions of said second actuating means and the first member in the lens assembly.

8. An extension tube according to claim 7, wherein said interchanging means includes a ring member connected to said tubular body, said ring member having a control portion for contacting and displacing said second actuating means in response to rotation of said tubular body about the axis of said tubular body.

9. An extension tube according to claim 7, wherein said transmitting means comprises:

(a) first bell crank means arranged for pivotal movement in response to the rotational movement of said first actuating means;

(b) second bell crank means arranged for pivotal movement to engage the first member of said lens assembly; and (c) a transmitting member arranged between said first bell crank means and said second bell crank means to transmit the movement of said first bell crank means to said second bell crank means.

10. An extension tube according to claim 9, wherein said first bell crank means includes a first bell crank member and said second bell crank means includes a second bell crank member, and said first and said second bell crank members are each pivotally mounted to said guide means.

11. An extension tube according to claim 10, including a spring connected between said first bell crank member and said second bell crank member for urging confronting ends of said first and said second bell crank members to pivot toward one another.

12. An extension tube according to claim 8, wherein said ring member is pivotally mounted to the inner circumferential surface of said tubular body so that said ring member is rotatable together with said tubular body about the axis of said tubular body and said ring member can be swung so that the plane containing said ring member rotates about an axis which is transverse to the axis of said tubular body.

* * * * *